US008649447B2

(12) United States Patent
Mohebbi

(10) Patent No.: US 8,649,447 B2
(45) Date of Patent: Feb. 11, 2014

(54) OFDM MODEM USING PILOT SUB-CARRIER STRUCTURE

(75) Inventor: Behzad B. Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 886 days.

(21) Appl. No.: 12/203,106

(22) Filed: Sep. 2, 2008

(65) Prior Publication Data

US 2009/0060075 A1    Mar. 5, 2009

Related U.S. Application Data

(60) Provisional application No. 60/969,519, filed on Aug. 31, 2007.

(51) Int. Cl.
*H04L 27/28*  (2006.01)
(52) U.S. Cl.
USPC .......................................... 375/260; 375/259
(58) Field of Classification Search
USPC ................................................ 375/260, 259
See application file for complete search history.

(56) References Cited

U.S. PATENT DOCUMENTS

| 2007/0053282 A1* | 3/2007 | Tong et al. ..................... 370/208 |
| 2007/0140323 A1 | 6/2007 | Patel |
| 2008/0117995 A1* | 5/2008 | Anderson et al. ............. 375/260 |
| 2008/0253279 A1* | 10/2008 | Ma et al. ........................ 370/206 |
| 2008/0253469 A1* | 10/2008 | Ma et al. ........................ 375/260 |

FOREIGN PATENT DOCUMENTS

| EP | 1 367 752 A | 12/2003 |
| JP | 2006518971 A | 8/2006 |
| WO | WO 2005/088882 A | 9/2005 |
| WO | WO-2005088882 A1 | 9/2005 |
| WO | WO-2006019708 A1 | 2/2006 |

OTHER PUBLICATIONS

International Search Report for related patent PCT/US2008/075053 performed by International Searching Authority/EP on Dec. 1, 2008.
Written Opinion for related patent PCT/US2008/075053 performed by International Searching Authority/EP on Dec. 1, 2008.
Bing Han et al., "An iterative joint channel estimation and symbol detection algorithm applied in OFDM system with high data to pilot power radio," IEEE International Conference on Communications May 11-15, 2003, Anchorage, AK, IEEE, Piscataway, NJ 2003, vol. 3 p. 2076-2080.

* cited by examiner

*Primary Examiner* — Michael Neff
(74) *Attorney, Agent, or Firm* — Mintz Levin Cohn Ferris Glovsky and Popeo, P.C.

(57) ABSTRACT

An OFDM modem is presented that uses a pilot sub-carrier signal structure for channel estimation to reduce link latency of the modem, or alternatively, a pseudo-random number sequence inserted into the OFDM signal for later detection for channel estimation. The OFDM signal includes multiple symbols, each symbol having a plurality of closely-spaced, orthogonal data sub-carrier signals carrying data. In some implementations, one or more pilot sub-carrier signals are inserted with the data sub-carrier signals. Each pilot sub-carrier signal is modulated with a predetermined pilot modulation scheme. Each pilot sub-carrier signal is placed at a different sub-carrier signal location for each successive symbol duration of the OFDM signal to form a sliding pilot sub-carrier signal.

15 Claims, 7 Drawing Sheets

OFDM MODEM USING PILOT SUB-CARRIER STRUCTURE

CROSS REFERENCE TO RELATED APPLICATIONS

This application claims the benefit under 35 U.S.C. Section 119(e) of a provisional application U.S. Ser. No. 60/969,519, entitled "OFDM Modem Using Pilot Sub-Carrier Structure," filed Aug. 31, 2007, which is incorporated by reference herein.

BACKGROUND

Orthogonal frequency division multiplexing (OFDM) modems are designed to meet the impairment of various communications environments that vary from a quasi-static channel of a wireline system, to a highly dynamic channel of a fast moving wireless mobile system. While the channel has a large impact on the modem performance and design, other requirements such as data rate, BER and latency of the end-to-end application places additional requirements, impacting the final design of the modem.

The OFDM modems for packet-based applications such as WiFi and WiMax usually can tolerate large latencies and as such can have interleaving, coding and preambles for channel estimation. A number of pilot channels, in the frequency domain, are also used to aid operations such as residual frequency offset removal, clock timing recovery and other fine tuning operations that require symbol-by-symbol correction. In circuit-switched (continues transmission) type OFDM links, most of the synchronization and acquisition algorithms are based on continuous received symbols (decision aided or directed). In CS OFDM links, while the latency requirements may be tighter than a packet-switch OFDM, the modem can still enjoy the presence of pilot tones in frequency, or time domain. The invention described here is to enable an OFDM modem with severe time and/or frequency constraint to perform channel estimation for the functional units in a modem such AFC, Maximal Ratio Combining and MIMO.

SUMMARY

This document presents an OFDM modem that uses a pilot sub-carrier signal structure for channel estimation to reduce link latency of the modem. The OFDM signal includes multiple symbols, each symbol having a plurality of closely-spaced, orthogonal data sub-carrier signals carrying data. In one implementation, a method includes inserting one or more pilot sub-carrier signals with the data sub-carrier signals. Each pilot sub-carrier signal is modulated with a predetermined pilot modulation scheme. The method further includes placing each pilot sub-carrier signal at a different sub-carrier signal location for each successive symbol duration of the OFDM signal to form a sliding pilot sub-carrier signal.

In another implementation, a method includes receiving an OFDM signal comprising a plurality of closely-spaced, orthogonal data sub-carrier signals carrying data, the OFDM signal further including one or more pilot sub-carrier signals that are inserted among the plurality of data sub-carrier signals and modulated with a predetermined pilot modulation scheme, each pilot sub-carrier signal being placed at a different sub-carrier signal channel location for each successive symbol duration of the OFDM signal to form a sliding pilot sub-carrier signal. The method further includes determining the one or more pilot sub-carrier signals for channel estimation of the OFDM signal to determine the plurality of data sub-carrier signals. In yet another implementation, a modem is presented. The modem includes a receiver to receive an OFDM signal as described above. The modem further includes a processor to determine the one or more pilot sub-carrier signals for channel estimation of the OFDM signal to determine the plurality of data sub-carrier signals.

In still yet another implementation, a method is presented for channel estimation of an OFDM signal. The method includes inserting a pseudo-random number sequence in each individual data sub-carrier signal at a signal power level below a data sub-carrier power level, receiving the OFDM signal at a receiver, and detecting the pseudo-random number sequence at the receiver for channel estimation of the OFDM signal to determine the plurality of data sub-carrier signals.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
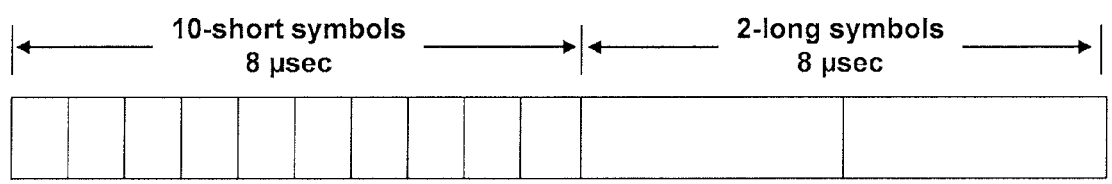
FIG. 1 shows an example of a preamble structure.

For the coherent reception of a signal it is important to know the signal's phase at any given time. However, the phase impairment of a time-varying propagation channel means that a continuous channel estimation is required to remove the effect of the propagation channel on the received signal phase. The channel estimation, which can be preformed in time or frequency, is then used to correct the phase of each sub-carrier accordingly. Channel estimation, in time or frequency, requires either a known sequence in time, or pilot sub-carriers in frequency domain, or both. FIG. 1 shows the pre-amble structure of a 802.11a OFDM link where ten "short" and two "long" symbols are transmitted at the beginning of each packet. While the short symbols are used for automatic gain control (AGC), coarse automatic frequency control (AFC) and packet detection, the long symbols are mostly used for fine AGC, channel estimation and symbol timing synchronization. The pre-amble symbols are designed such that their spectral response can also be used for a further fine tuning of the modem functions.

Figure 2:
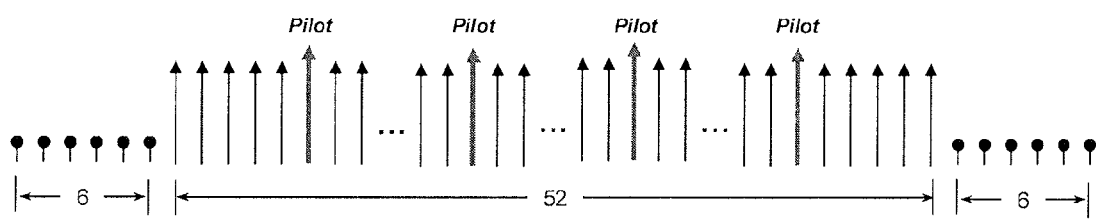
FIG. 2 shows an example of a pilot sub-carrier structure.

FIG. 2 shows 802.11a pilot sub-carriers (4) as an example of frequency domain pilots. These sub-carriers are used to fine tune the estimates of such elements as residual carrier frequency and phase offsets, clock timing errors and channel estimation.

If the link latency associated with repetitive preambles can not be tolerated, and the number of available pilot sub-carriers is limited, a "sliding pilot" is used to perform channel estimation of the entire band over several symbol durations. There can be one or a number of sliding pilot sub-carriers. As long as the channel coherence time is longer than channel estimation "refresh rate" (i.e., the rate in which a full sweep of all the sub-carriers is completed), the estimate of the channel can be used for the modem synchronization and detection algorithms. Using the 802.11a example and system parameters, FIG. 3 shows an example of a single "sliding pilot" sub-carrier.

Figure 3:
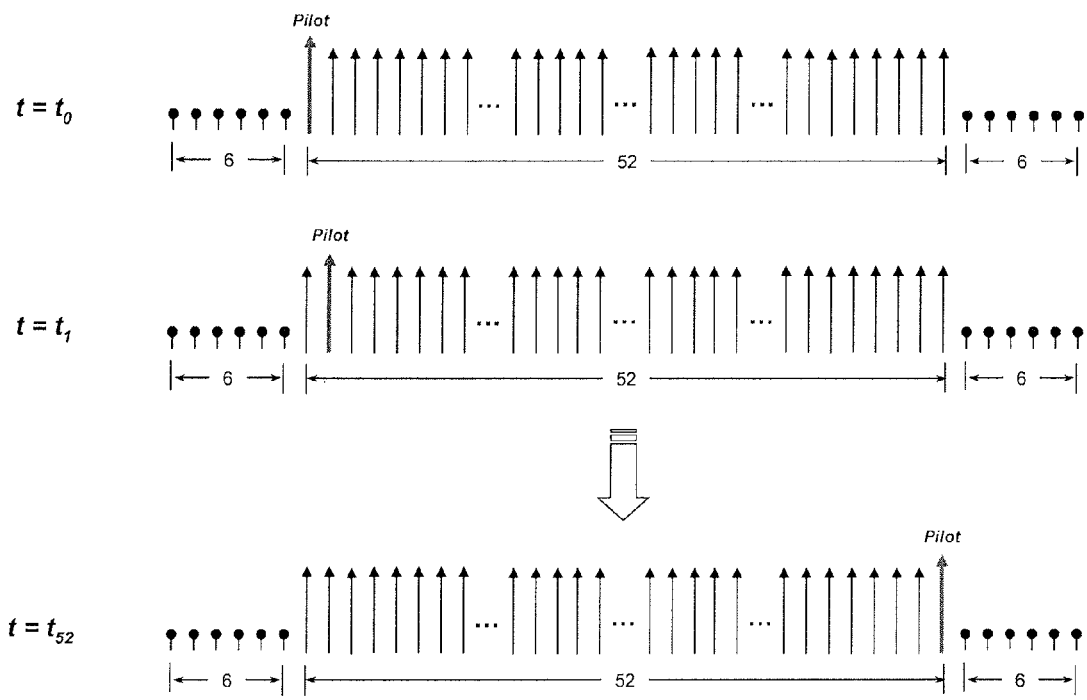
FIG. 3 shows an example of single "sliding pilot" sub-carrier structure.
Figure 4:
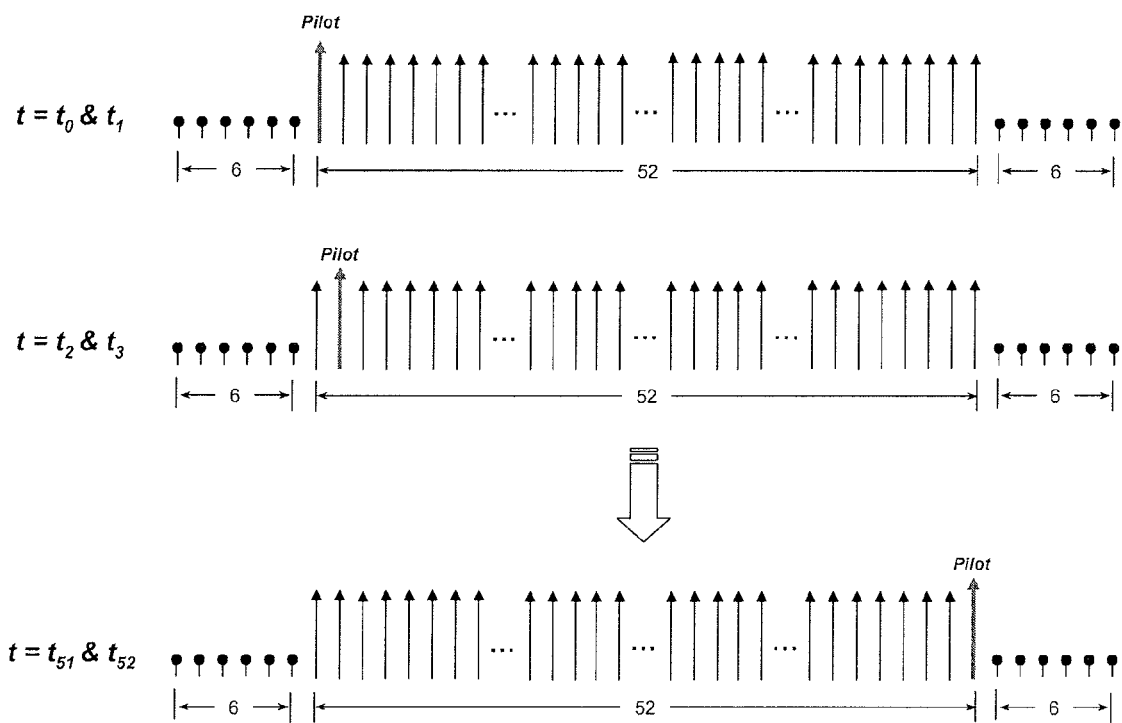
FIG. 4 shows an example of a single "sliding pilot" sub-carrier structure with multiple-symbol dwelling.

With reference to FIG. 3, the pilot sub-carrier transmitted during the symbol transmitted at time equal $t_0$ will have the pilot tone placed at active sub-carrier 1, while the pilot sub-carrier for the symbol at time equal $t_1$ would be at sub-carrier 2 and so on. As long as the refresh rate of the channel estimate is a fraction of the propagation channel coherence time, the channel estimates are valid. In the above example, with a 4 µsec symbol duration, 0.2 msec is required for a complete channel estimate. In an indoor environment with a mobile speed of 3 km/h, a channel coherence time of around 23 msec is expected, which is more than 100× longer than the channel estimate refresh rate. In fact, as shown in FIG. 4, the pilot can dwell on a given sub-carrier for two symbol duration (or more), without much impact on the channel estimation accuracy. By keeping the pilot tone on one sub-carrier during two consecutive symbols, it is possible to better estimate the phase, frequency and clock timing error. It also provides a better estimates of the channel amplitudes and phases.

Just like 802.11a, the sliding pilot can be modulated by a predetermined sequence, where this sequence can be used to identify the next sub-carrier location. Alternatively, if a frame (or time slot) synchronization mechanism exists between the transmitter and the receiver ends, the pilot sub-carrier selection can be synchronized with the frame boundary. It is also possible to transmit the pilot sub-carrier with higher power, compared to data sub-carriers, making it easy to identify the pilot sub-carrier while improving the channel estimation quality.

In order to aid the initial acquisition of the link (AGC, AFC, sample clock timing, Channel Estimate), it is possible to use a long training sequence (time and/or frequency based) at the beginning of a session, with sliding pilot used thereafter to track channel changes. It is also possible to aid this process with irregular training sequences that are transmitted as required based on the BER or FER failing to meet the required threshold, by blanking the data by the training sequence. It is also possible to send these short training sequences on regular but infrequent bases (Say every 100 msec), again by blanking the data, causing momentarily high BER.

Figure 5:
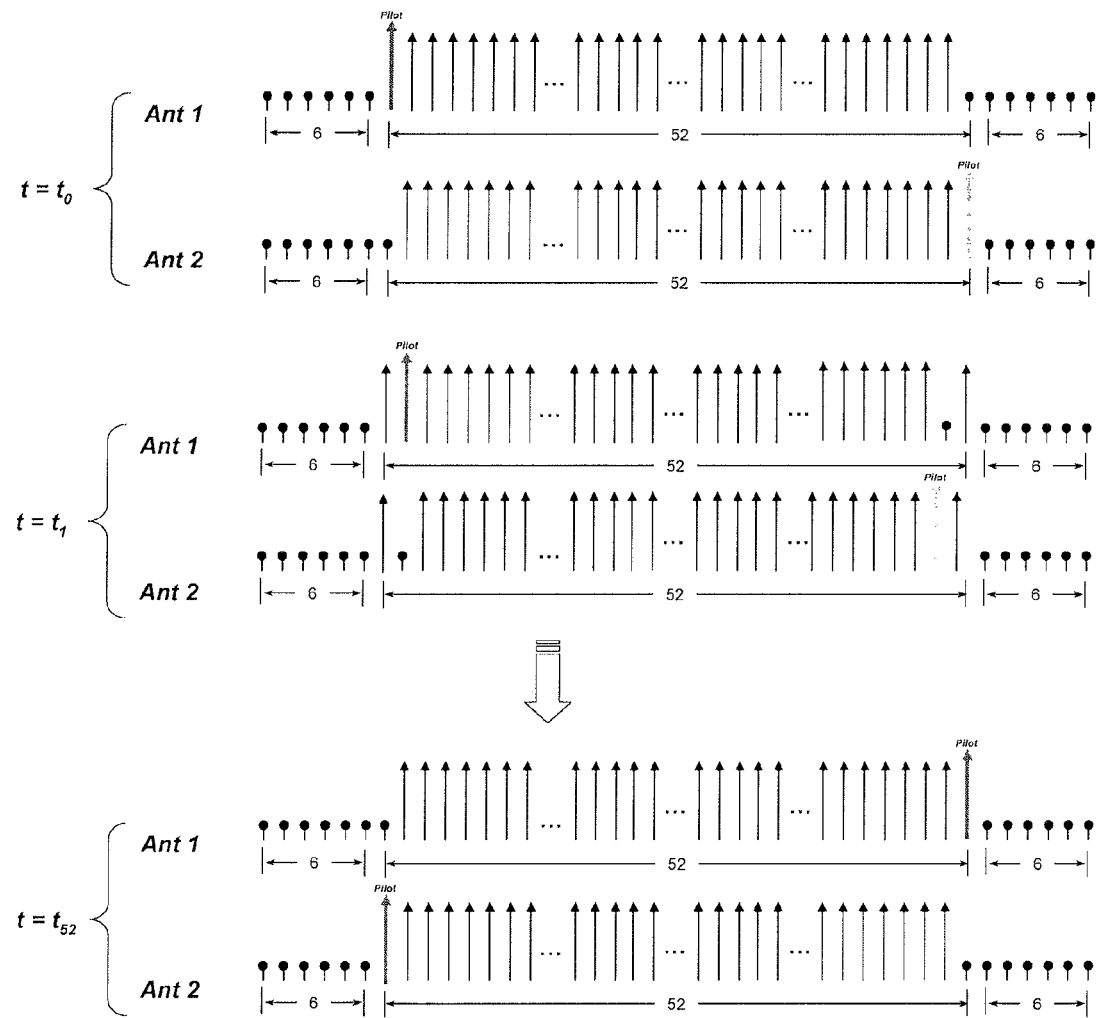
FIG. 5 shows an example of a "sliding pilot" sub-carrier structure with two antenna transmit diversity.

For most Multiple Transmit Antenna (MTA) and Multiple Input/Multiple Output (MIMO) schemes, the number of different channel estimations that are required are equal to the number of transmit braches. For a two antenna transmit Space-Time Transmit diversity (also know as STTD or Alamouti MIMO) scheme, two different channel estimations are required at the receiver(s). Therefore, the sliding pilot scheme can be modified (as shown in FIG. 5) to include a second pilot sub-carrier that can be sent by the second antenna. FIG. 5 shows the example were the single sub-carriers are transmitted from opposite directions of the spectrum (note that multiple sub-carriers also possible). However, it is also possible that they can "slide" from the same spectrum side with a fixed or varying offset. In both cases care has to be taken to "NULL" out or reduce the transmit power of the pilot sub-carrier associated with the other antenna(s). If the number of active sub-carriers is odd, the pilot sub-carriers will have the same index in the middle of the spectrum. However, this should cause no problem as the centre sub-carrier is DC and usually carries no power (i.e. Nulled out). The same Pilot "Dwelling" and pilot modulation pattern which were described above for a single antenna case, can also be applied to the MTA and MIMO schemes.

Figure 6:
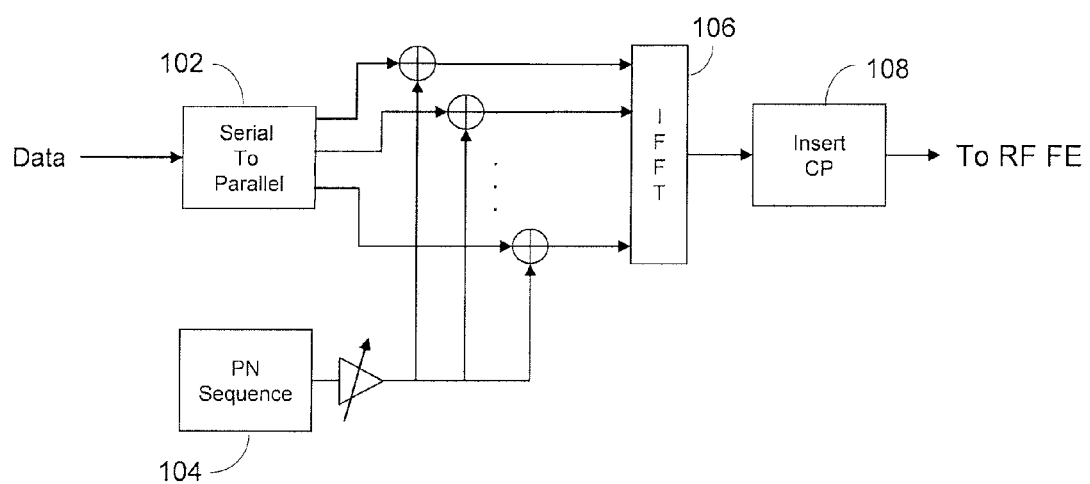
FIG. 6 shows an example of "pilot underlay" for a single antenna transmitter.

An alternative approach for inserting a pilot tone is shown in FIG. 6. In the alternative approach, a pilot underlay system 100 includes a serial-to-parallel block 102, and a pseudo-random noise (PN) sequence generator 104 to generate a pseudo-random noise (PN) sequence. The PN sequence generator 104 inserts a PN sequence into the parallel signal below the OFDM waveform, and is used for channel estimation. A common code for all sub-carriers, with the final OFDM transmitter bandwidth, can be inserted in time after an inverse fast-fourier transform (IFFT) block 106 or Cyclic Prefix (CP) inserter module 108. As illustrated in FIG. 6, however, the PN code is inserted under each individual sub-carrier before the IFFT block 106. Therefore, the PN code will have a maximum bandwidth of a single sub-carrier (in FIG. 6), and is inserted at a level below the main sub-carrier signal power such that a target bit error rate (BER) with the sub-carrier modulation scheme can still be met at the receiver. As an example, for BPSK and QPSK, the PN sequence can be inserted more than 10 dB below the average power of the sub-carriers (assuming all sub-carriers have the same average power), which will have little or no impact on the BER performance.

At the receiver after FFT, correlation with the transmitted PN code (in much the same way as spread spectrum systems), will reveal the channel impulse response of each sub-carrier branch. The correlation time window depends on the channel coherence time and the degree of synchronization between the transmitter and receiver local oscillators. A 128-chip PN sequence will provide 21 dB of processing gain in 400 µsec, which is well below the channel coherence time of 23 msec.

Figure 7:
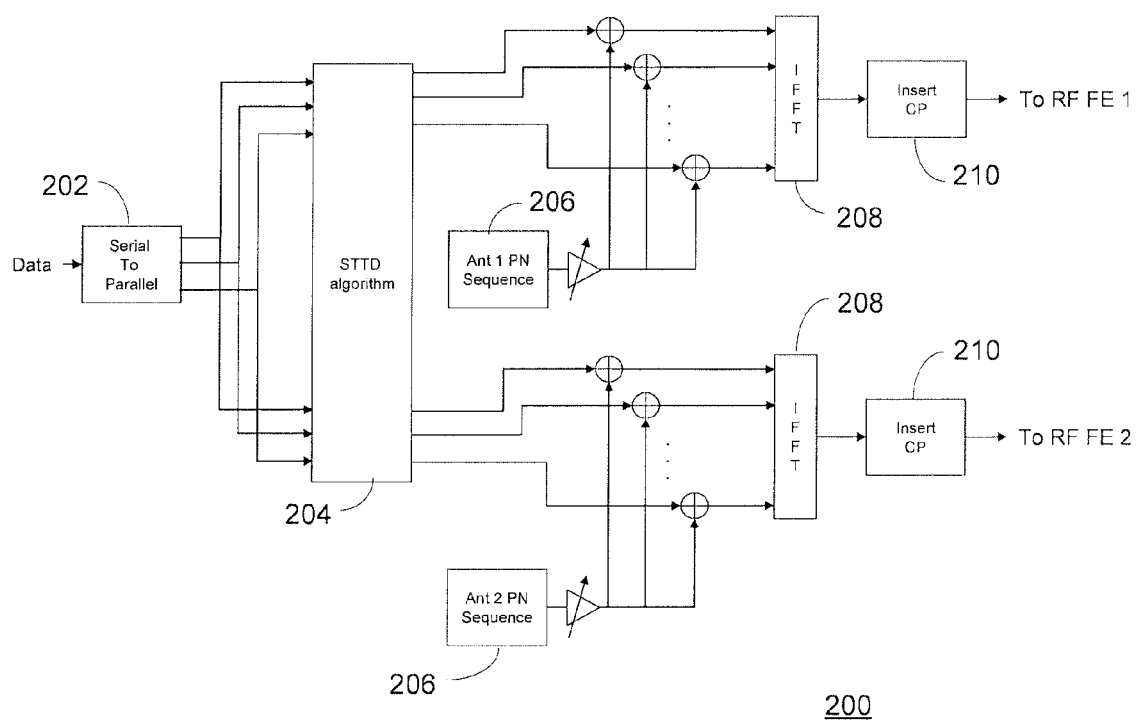
FIG. 7 shows an example of "pilot underlay" for a two-antenna transmitter with STTD.

For MTA and MIMO schemes, different PN codes can be used for each of the transmit branches. An MTA Pilot Underlay system 200 is shown in FIG. 7. The MTA Pilot Underlay system 200 includes a serial to parallel block 202, and STTD algorithm block 204 for a two antenna transmit diversity STTD scheme, in which PN sequence generators 206 are coupled to each branch. Each branch further includes an inverse fast-fourier transform (IFFT) block 208 and Cyclic Prefix (CP) inserter module 210. The PN sequence codes for each branch ideally have code cross and auto correlation properties. As before, at the receiver, correlation with the transmitter PN sequence codes will reveal the channel estimation for each transmitter branch.

As used herein, the term "block" refers to a functional block that can be implemented in software and executed by a computer processor, or which may be implemented in hardware or firmware. In a hardware implementation, a block can be made up of microprocessor circuitry or other hardware devices.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a transmitter system, a modem, or a receiver system, to name just a few. Information carriers suitable for embodying computer program instructions and data include all forms of non volatile memoir, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Although a few embodiments have been described in detail above, other modifications are possible. Other embodiments may be within the scope of the following claims.

What is claimed:

1. In a single transmit branch orthogonal frequency-division multiplexing (OFDM) signal comprising a plurality of symbols, each symbol having a plurality of closely-spaced, orthogonal data sub-carrier signals carrying data, a method comprising:
    inserting one or more pilot sub-carrier signals with the data sub-carrier signals, each pilot sub-carrier signal being modulated with a predetermined pilot modulation scheme; and
    placing each pilot sub-carrier signal at an adjacent sub-carrier signal location for a first duration of some successive symbols of the OFDM signal to form a sliding pilot sub-carrier signal, each pilot sub-carrier signal being placed at a same sub-carrier signal location for a second duration of other successive symbols of the OFDM signal, such that for each pair of consecutive symbols in the OFDM signal, each pilot sub-carrier signal is placed either at the same sub-carrier signal location or at an adjacent sub-carrier signal location,
        wherein over a third duration of the plurality of symbols at least one pilot sub-carrier signal is placed at each data sub-carrier signal location of the OFDM signal for at least one symbol.

2. The method in accordance with claim 1, further comprising transmitting the OFDM signal with the sliding pilot sub-carrier signal according to the predetermined pilot modulation scheme.

3. The method in accordance with claim 2, further comprising:
    receiving each successive symbol duration of the OFDM signal; and
    determining the one or more pilot sub-carrier signals for channel estimation of the OFDM signal to determine the plurality of data sub-carrier signals.

4. The method in accordance with claim 3, wherein the channel estimation occurs over two or more symbol durations.

5. The method in accordance with claim 1, wherein the predetermined pilot modulation scheme includes transmitting each pilot sub-carrier signal at a higher power than each data sub-carrier signal.

6. The method in accordance with claim 1, wherein the predetermined pilot modulation scheme includes synchronizing modulation sequence with a frame boundary, with each frame consisting of one or more OFDM symbols.

7. The method in accordance with claim 1, wherein the OFDM signal is adapted for transmission on a plurality of antennas, each antenna corresponding to a different channel, and wherein the inserting one or more pilot sub-carrier signals further includes inserting one or more pilot sub-carrier signals with the data sub-carrier signals on each channel.

8. A method comprising:
    receiving an orthogonal frequency-division multiplexing (OFDM) signal comprising a plurality of symbols, each symbol having a plurality of closely-spaced, orthogonal data sub-carrier signals carrying data, the OFDM signal further comprising one or more pilot sub-carrier signals that are inserted among the plurality of data sub-carrier signals and modulated with a predetermined pilot modulation scheme, each pilot sub-carrier signal being placed at an adjacent sub-carrier signal channel location for a first duration of some successive symbols of the OFDM signal to form a sliding pilot sub-carrier signal, the pilot sub-carrier signal being placed at a same sub-carrier signal location for a second duration of other successive symbols of the OFDM signal, such that for each pair of consecutive symbols in the OFDM signal, each pilot sub-carrier signal is placed either at the same sub-carrier signal location or at an adjacent sub-carrier signal location, wherein over a third duration of the plurality of symbols at least one pilot sub-carrier signal is placed at each data sub-carrier signal location of the OFDM signal for at least one symbol; and
    determining the one or more pilot sub-carrier signals for channel estimation of the OFDM signal to determine the plurality of data sub-carrier signals.

9. The method in accordance with claim 8, wherein the sliding pilot sub-carrier signal is placed at a successive sub-carrier signal channel location during each successive symbol duration.

10. The method in accordance with claim 8, wherein the different sub-carrier signal channel location is based on an encoded sequence.

11. The method in accordance with claim 8, wherein the predetermined pilot modulation scheme includes transmitting each pilot sub-carrier signal at a higher power than each data sub-carrier signal.

12. The method in accordance with claim 8, wherein the predetermined pilot modulation scheme includes synchronizing each pilot sub-carrier signal with a frame boundary of each symbol duration.

13. The method in accordance with claim 8, wherein receiving the OFDM signal further includes receiving multiple channels of the OFDM signal on corresponding multiple antennas;
    and wherein determining the one or more pilot sub-carrier signals for channel estimation of the OFDM signal further includes determining the one or more pilot sub-carrier signals for channel estimation for each of the multiple channels.

14. A modem comprising:
    a receiver to receive an orthogonal frequency-division multiplexing (OFDM) signal comprising a plurality of symbols, each symbol having a plurality of closely-spaced, orthogonal data sub-carrier signals carrying data, the OFDM signal further comprising one or more pilot sub-carrier signals that are inserted among the plurality of data sub-carrier signals and modulated with a predetermined pilot modulation scheme, each pilot sub-carrier signal being placed at an adjacent sub-carrier signal channel location for a first duration of some successive symbols of the OFDM signal to form a sliding pilot sub-carrier signal, the pilot sub-carrier signal being placed at a same sub-carrier signal location for a second duration of other successive symbols of the OFDM signal, such that for each pair of consecutive symbols in the OFDM signal, each pilot sub-carrier signal is placed either at the same sub-carrier signal location or at an adjacent sub-carrier signal location, wherein over a third duration of the plurality of symbols at least one pilot sub-carrier signal is placed at each data sub-carrier signal location of the OFDM signal for at least one symbol; and a processor to determine the one or more pilot sub-carrier signals for channel estimation of the OFDM signal to determine the plurality of data sub-carrier signals.

15. The modem in accordance with claim 14, wherein the processor further includes a decoder to decode the received OFDM signal.

\* \* \* \* \*